United States Patent [19]
Yonezawa

[11] Patent Number: 4,948,105
[45] Date of Patent: Aug. 14, 1990

[54] HYDRAULIC CLAMP

[75] Inventor: Keitaro Yonezawa, Amagasakishi, Japan

[73] Assignee: Kabushiki Kaisha Kosmek, Hyogoken, Japan

[21] Appl. No.: 265,224

[22] Filed: Nov. 1, 1988

[30] Foreign Application Priority Data

| Nov. 9, 1987 | [JP] | Japan | 62-282665 |
| Dec. 28, 1987 | [JP] | Japan | 62-335141 |
| Jan. 25, 1988 | [JP] | Japan | 63-8768 |
| Feb. 2, 1988 | [JP] | Japan | 63-13155 |

[51] Int. Cl.$^5$ .............................................. B23Q 3/02
[52] U.S. Cl. ....................................... 269/32; 269/309
[58] Field of Search ...................... 29/56.6, 57, 281.1;
409/219, 225, 227, 903; 408/79; 279/4, 121;
269/48.1, 49, 50, 292, 293, 294, 309, 20, 900,
329, 93, 94, 91, 310; 198/345

[56] References Cited

U.S. PATENT DOCUMENTS 4,504,046 3/1985 Yonezawa et al.
4,577,847 3/1986 Schedwin ............................ 269/309
4,688,974 8/1987 Wright et al. ........................ 269/309

Primary Examiner—Robert C. Watson
Attorney, Agent, or Firm—Lowe, Price, LeBlanc, Becker & Shur

[57] ABSTRACT

A hydraulic clamp, which actuates a clamping means by a hydraulic pressure of a hydraulic cylinder, has a clamping actuation oil chamber, a piston and the clamping means arranged in a cylinder body of the hydraulic cylinder in this order in the axial direction of the hydraulic cylinder. The clamping means is adapted to be shifted expansively and contractively between advanced position clamping and a retracted position (unclamping) which are at different distances from the axis of the hydraulic cylinder. The clamping means is adapted to be advanced from the retracted position to the advanced position in an early stage of the application of a hydraulic actuation force in the clamping actuation oil chamber, by which the piston is hydraulically actuated, and the clamping means is adapted to be actuated for clamping by a latter stage of the hydraulic pressure in the clamping actuation oil chamber.

10 Claims, 15 Drawing Sheets

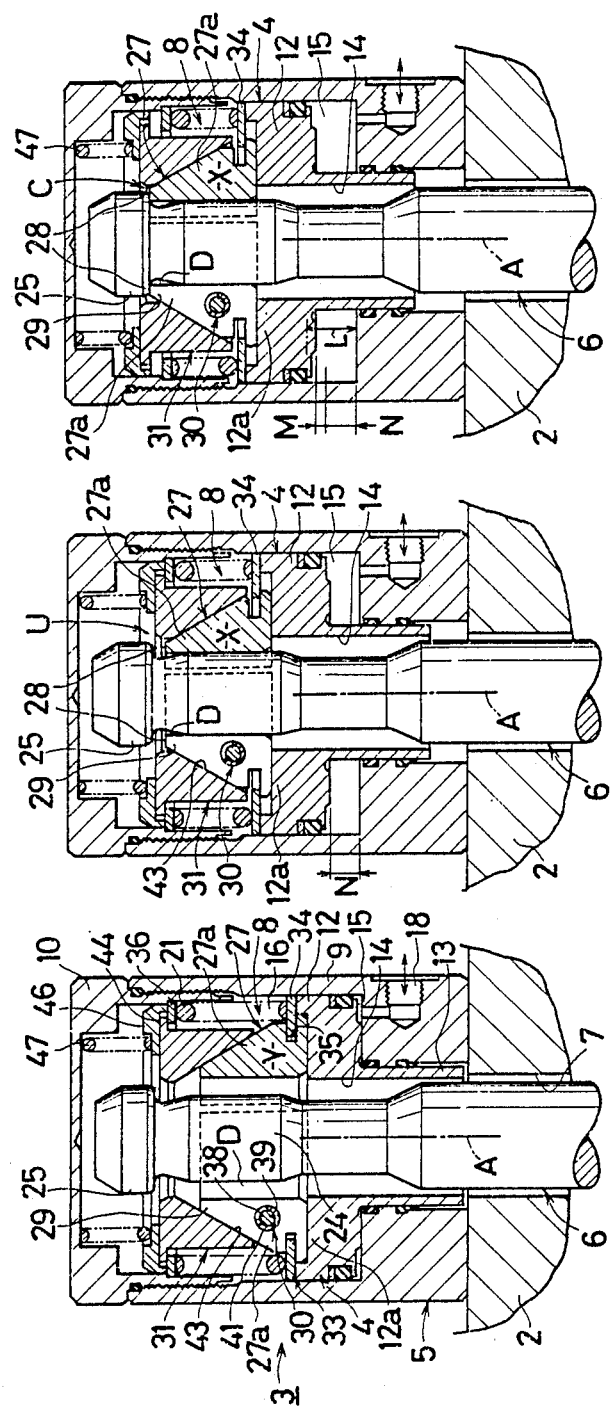

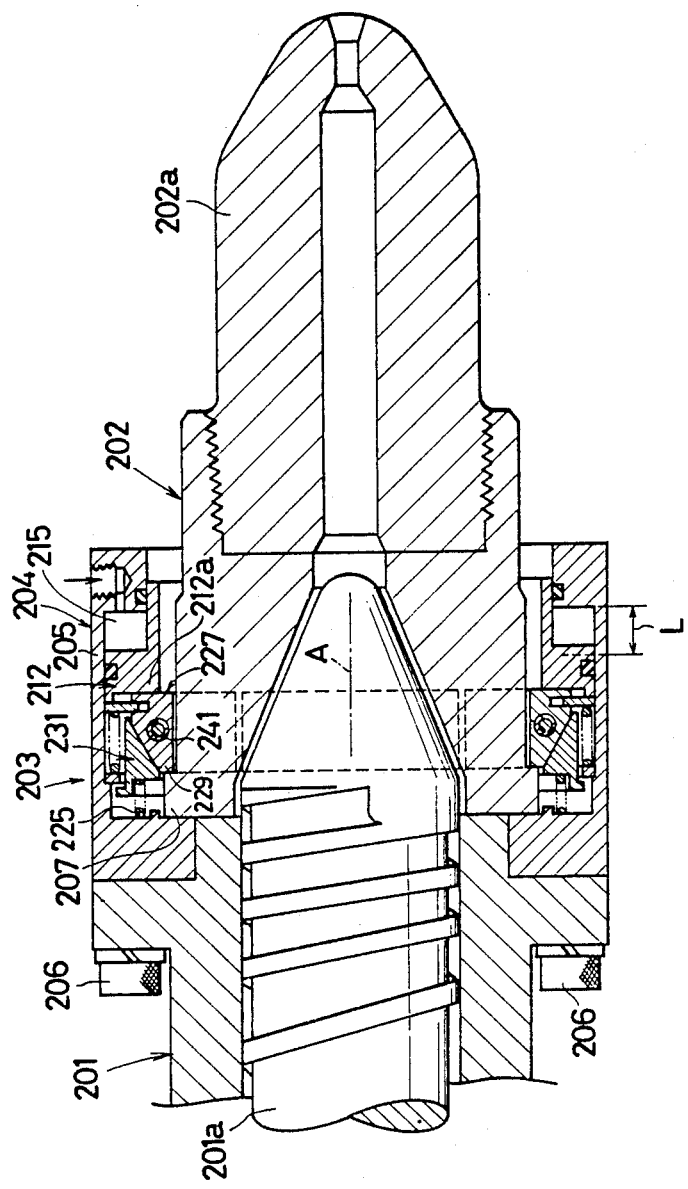

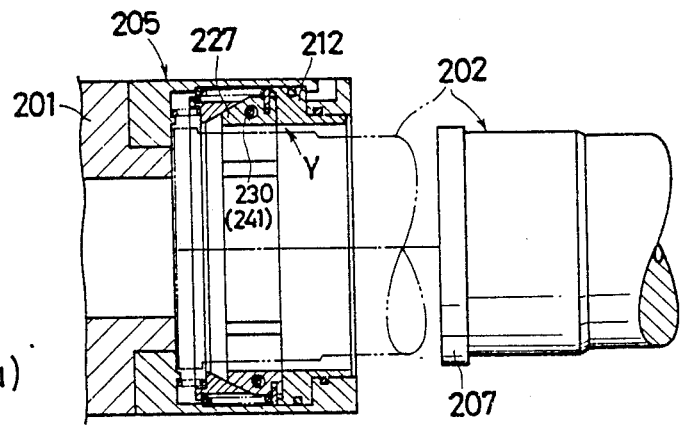
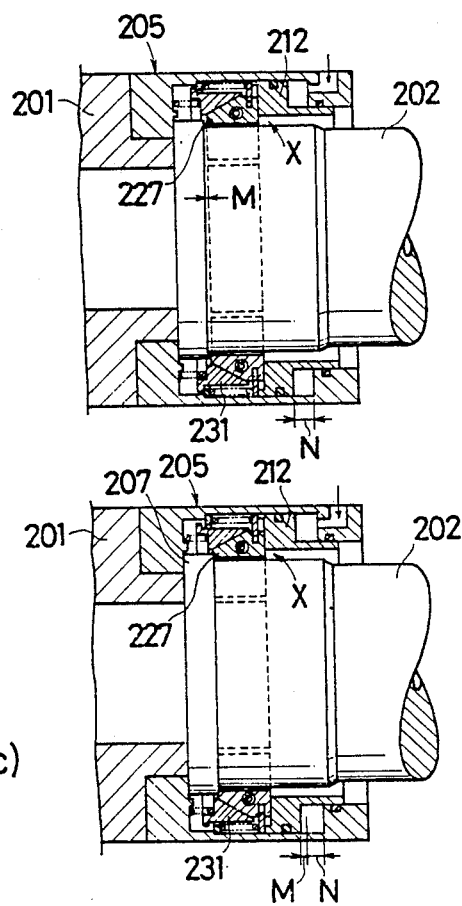
FIG. 24(a)
FIG. 24(b)
FIG. 24(c)

HYDRAULIC CLAMP

BACKGROUND OF THE INVENTION

1. Field of the Invention

The present invention relates to a hydraulic clamp which serves to fixedly press a member to be clamped, through a clamping means by a hydraulic oil pressure of a hydraulic cylinder.

2. Background of the Prior Art

Means for detachably fixing a member to be clamped to a fixed member, have been known e.g. the one shown in FIG. 33.

In this example, a flange 303 of a cylinder head 302 that is member to be clamped is adapted to be fixed to a screw cylinder 301 as a fixed member of an injection molding machine by means of a plurality of detachable bolts 304.

This fixing means has an advantage of being simple in construction, but has a disadvantage in that it requires much labor for clamping because the detachable bolts 304 are threadably engaged and tightened manually in threaded holes of the screw cylinder 301 whenever the cylinder 302 as a member to be clamped is exchanged.

For eliminating this disadvantage, the inventor of the present invention previously contrived a clamping apparatus which performs a clamping operation automatically through a plurality of hydraulic clamps of the type having retractable clamping means. Construction of a hydraulic clamp of the type having retractable clamping means is known, for example as shown in U.S. Pat. No. 4,504,046 (Date of Patent: Mar. 12, 1985) proposed previously by the inventor of the present invention.

The above-mentioned clamping apparatus has an adapter plate fixed on the leading end surface of a screw cylinder and a plurality of hydraulic cylinders arranged in the peripheral direction of the adapter plate with the respective clamping means thereof facing toward the center side of the adapter plate. At the time of the clamping operation, first of all the clamping means of each hydraulic cylinder is retracted in the front portion of the clamp body and then a cylinder head is placed on the central portion of the adapter plate under such retracted condition of the clamping means. Next, the clamping means is advanced outside the front portion of the clamp body by a hydraulic pressure of the hydraulic cylinder so that the flange of the cylinder head as a passive portion is pressed to the adapter plate by each clamping means.

However, the following disadvantages (a) and (b) are associated with the clamp apparatus:

(a) The whole of the clamp apparatus is large.

Since the respective hydraulic clamps project radially from the clamping position of the member to be clamped, the external size of the clamp apparatus gets large and the whole thereof gets large-sized.

(b) The clamping force per unit area is small.

Since the arrangement pitches of the clamping means in the peripheral direction get necessarily large for preventing the interferences between the neighboring hydraulic clamps and the unclampable range gets large, the clamping force per unit area is small. Therefore, the pressure per unit area exerted to the flange of the member to be clamped gets large and tends to damage and deform the flange.

SUMMARY OF THE INVENTION

An object of the present invention is to provide a hydraulic clamp in which the clamping operation can be performed readily, the whole of a clamp apparatus can be made small and the clamping force per unit area can be increased.

For accomplishing this and other related objects, a hydraulic clamp according to the present invention is constructed as follows.

A cylinder body of a hydraulic cylinder is provided with a clamping actuation oil chamber, a piston and a clamping means arranged in this order along the axial direction of the hydraulic cylinder. The clamping means is constructed so as to be expanded and contracted between on advanced a clamping position and a retracted or unclamping position which are respectively at different distances from the axis of the hydraulic cylinder. The clamping means adapted to be pushed toward the retracted position side by a retracting means and to be pushed toward the advanced position side by an advancement slant cam.

Initially, the clamping means is pushed from the retracted position to the advanced position through the advancement slant cam at an early stage of applying a hydraulic actuation force within the clamping actuation oil chamber for hydraulically actuating the piston and then the clamping means is actuated for clamping from an unclamped position to a clamped position by a latter stage of applying the hydraulic actuation force within the clamping actuation oil chamber.

In the above-mentioned construction, the clamping means is adapted to be actuated in two ways for switching over from the retracted position to the advanced position, namely in a contracting manner respectively and in an expanding manner.

Since the present invention is constructed and functions as mentioned above, the following advantages can be attained.

(a) The clamping operation becomes easy.

Since the clamping means is adapted to be operated in a sequential switching interlockingly with the piston within the hydraulic cylinder, it is not necessary to manipulate the clamping means manually and it becomes easy to perform the clamping operation of the hydraulic clamp.

(b) The clamp apparatus can be made small in size and simplified.

Since the hydraulic clamp does not project largely in the radial direction, the external size of the apparatus can be made small and the apparatus can be manufactured in a small size. Further, since an actuation device as well as a control device to be used only for switching over are not required for the sequential switching operation of the clamping means, the entire construction thereof can be simplified and the manufacturing cost can be reduced.

(c) The manipulation of the hydraulic clamp becomes easy.

Further, since the actuation device and the control device to be used only for switching over can be omitted as mentioned above, the hydraulic clamp can be made small in size and light in weight. Accordingly, the manipulation of the hydraulic clamp becomes easy and the working efficiency is enhanced.

(d) The clamping force per unit area is large.

Since the clamping means can be arranged along the periphery of the passive portion formed in the member to be clamped or in the member to be forced, a range incapable of being forced can be made less and the clamping force per unit area can be made large. Consequently, the clamping capability of the hydraulic clamp can be enhanced.

(e) The durability of the passive portion which is formed in the member to be clamped or in the member to be forced is high.

Since the clamping means can have a large transmission area for a clamping force owing to the reduction of the range incapable of being forced as mentioned above, the pressure per unit area exerted on the passive portion can be kept small. And since the transmission surface of the clamping means can be provided substantially uniformly throughout the periphery of the passive portion, stress concentration can be prevented and a bending stress is hardly generated. Since the force per unit area is small and the generation of the bending stress can be prevented in that way, the durability of the passive portion is enhanced.

(f) Uneven tightening for the passive portion can be prevented.

In the case that the clamping operation is performed by one hydraulic clamp, since the whole periphery of the passive portion can be tightened simultaneously evenly by the clamping means, uneven tightening for the passive portion can be prevented. Therefore, for example in case that the hydraulic clamp is employed for detachably mounting a lid of a sealed container, a good sealing therefor can be attained.

(g) The total clamping force in a certain extent of mounting space is enhanced.

Since the mounting space is made small by the compact arrangement as mentioned above, the mounting pitch of the hydraulic clamps can be made small and the mounting number of the hydraulic clamps can be increased in the case that a great number of hydraulic clamps are mounted and operated in a certain mounting space. Consequently, the total clamping force obtained by summing up the clamping forces of the all mounted hydraulic clamps can be increased.

BRIEF DESCRIPTION OF THE DRAWINGS

FIGS. 1 through 32 are views showing embodiments of the present invention;

FIGS. 1 through 7 show the first embodiment;

FIG. 1 is a total view showing a using condition of a hydraulic clamp;

FIG. 2 is an explanatory view of the operation of the hydraulic clamp, FIG. 2(a) is a view showing an unclamped condition, FIG. 2(b) is a view showing a switching transitive condition, and FIG. 2(c) is a view showing a clamped condition;

FIG. 3 is a perspective view showing a clamping means of the hydraulic clamp;

FIG. 4 is a plan view showing the clamping means existing in an advanced position;

FIG. 5 is a plan view showing the clamping means existing in an a retracted position;

FIG. 6 is a sectional view on VI—VI line in FIG. 4;

FIG. 7 is a sectional view on VII—VII line in FIG. 5;

FIGS. 8 through 14 show variant examples of said first embodiment;

FIG. 8 shows the first variant example and is a view corresponding to FIG. 2:

FIG. 9 shows the second variant example and is a view corresponding to FIG. 2(a);

FIG. 10 and FIG. 11 show the third variant example;

FIG. 10 is a view corresponding to FIG. 2(a);

FIG. 11 is a sectional view on XI—XI line in FIG. 10;

FIG. 12 and FIG. 13 show the fourth variant example;

FIG. 12 is a vertical sectional view of a principal part of the hydraulic clamp;

FIG. 13 is a sectional view on XIII—XIII line in FIG. 12;

FIG. 14 shows the fifth variant example and is a partial view corresponding to FIG. 2(a);

FIG. 15 shows the second embodiment and is a total view showing a using condition of the hydraulic clamp;

FIG. 16 shows the third embodiment and is a total view showing a using condition of the hydraulic clamp;

FIG. 17 shows the fourth embodiment and is a partial view of the hydraulic clamp;

FIGS. 18 through 20 show the fifth embodiment;

FIG. 18 is a plan view showing a mounting condition of a plurality of hydraulic clamps;

FIG. 19 is a partial sectional view on XIX—XIX line in FIG. 18;

FIG. 20 is a sectional view on XX—XX line in FIG. 19;

FIG. 21 and FIG. 22 show variant examples of the fifth embodiment;

FIG. 21 shows the first variant example and is a partial view showing a mounting condition of the hydraulic clamp;

FIG. 22 shows the second variant example and is a partial view showing a mounting condition of the hydraulic clamp;

FIGS. 23 through 28 show the sixth embodiment;

FIG. 23 is a total view showing a using condition of the hydraulic clamp;

FIG. 24 is an explanatory view of the operation of the hydraulic clamp, FIG. 24(a) is a view showing an unclamped condition, FIG. 24(b) is a view showing a switching transitive condition, and FIG. 24(c) is a clamped condition;

FIG. 25 is a plan view showing a clamping means existing in the unclampable retracted position;

FIG. 26 is a plan view showing the clamping means existing in the clampable advanced position;

FIG. 27 is a sectional view on XXVII—XXVII line in FIG. 25;

FIG. 28 is a sectional view on XXVIII—XXVIII line in FIG. 26;

FIG. 29 and FIG. 30 show the seventh embodiment;

FIG. 29 is an external view showing a using condition of the hydraulic clamp;

FIG. 30 is a sectional view on XXX—XXX line in FIG. 29;

FIG. 31 shows the eighth embodiment and is a sectional view of a using condition of the hydraulic clamp;

FIG. 32 shows the ninth embodiment and is a sectional view of a using condition of the hydraulic clamp.

DESCRIPTION OF THE PREFERRED EMBODIMENTS

The preferred embodiments of the present invention will now be explained with reference to the drawings.

First Embodiment

FIGS. 1 through 7 show the first preferred embodiment.

Figure 1:
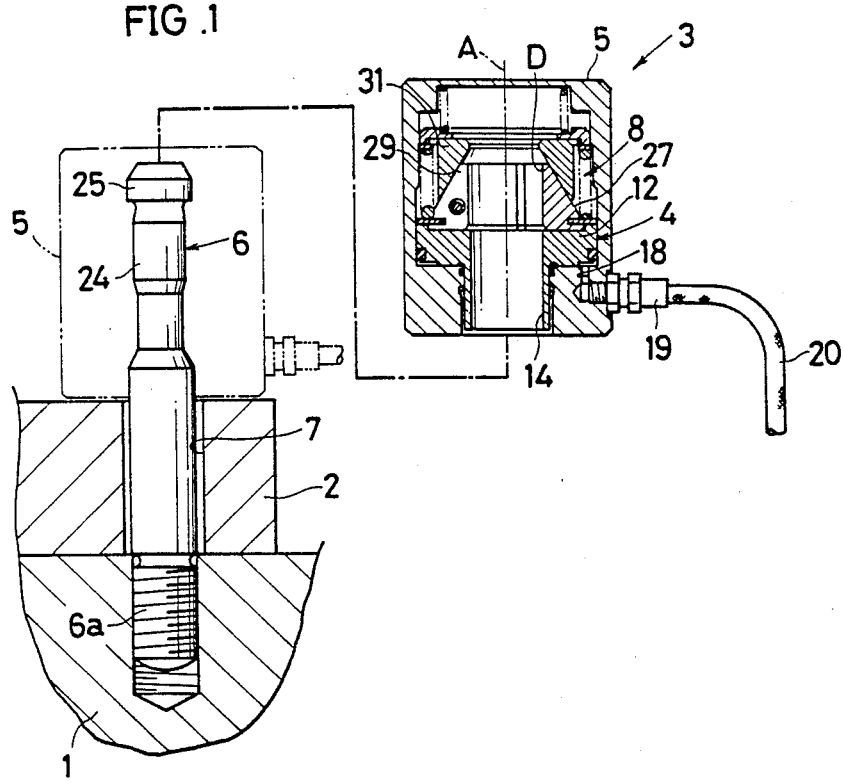
Figure 3:
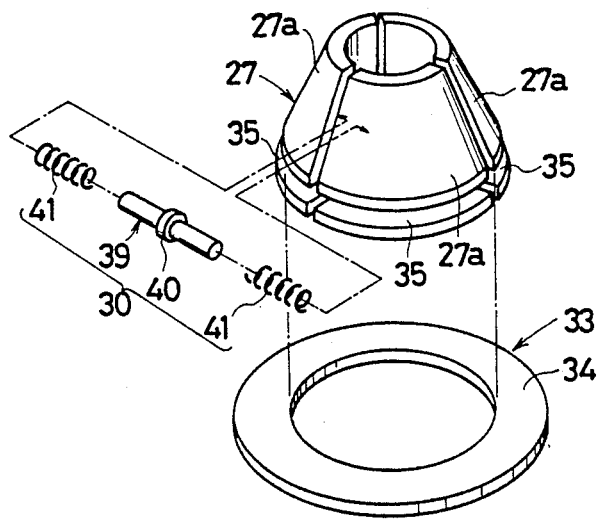

In a total view of FIG. 1, a mold 2, which is a member to be clamped is fixedly secured through a hydraulic clamp 3 onto the upper surface of a fixture stand 1 as a fixed member. The hydraulic clamp 3 is adapted to pressedly fix the mold 2 between the fixture stand 1 and the one end (the lower end in the drawings) of the cylinder body 5 of the hydraulic cylinder 4 by a hydraulic pressure of a hydraulic cylinder 4 through a clamp rod 6 as a member to be forced for clamping. The clamp rod 6 is passed vertically through a hole 7 for tightening the mold 2 and is threadably fixed at the foot portion 6a of its one end side (the lower end side in the drawings) to the fixture stand 1. Within the upper portion of the cylinder body 5, there is provided a clamping force switching means 8.

At the time of the clamping operation, first of all the cylinder body 5 is put about the clamp rod 6 so as to be inserted thereby 6 from the upper side by a hand of a worker. Then, a pushing-up force is applied to the clamp rod 6 by a hydraulic pressure of the hydraulic cylinder 4 through the clamping force switching means 8 so that the mold 2 can be pressedly fixed on the upper surface of the fixture stand 1 by a reaction force exerting to the cylinder body 5.

The construction of above-mentioned hydraulic clamp 3 will be explained in more detail with reference to FIGS. 2(a) through 2(c).

First of all, the hydraulic cylinder 4 will be explained.

The hydraulic cylinder 4 is of the type that is returned by a single-acting spring, and the cylinder body 5 thereof comprises a cylinder member 9 and a cover plate 10 threadably secured to the upper portion of the cylinder member 9. And a piston 12 is provided vertically slidably in an oil-tight manner within the lower portion of the cylinder member 9. A guide rod 13 is projected from the underside of the piston 12. A through-hole 14 for the clamp rod 6 is formed in both the piston 12 and the guide rod 13 along substantially the same axis as the axis A of the hydraulic cylinder 4. A clamping actuation oil chamber 15 is provided below the piston 12, and a spring chamber 16 is provided above the piston 12. As shown in FIG. 1, the clamping actuation oil chamber 15 is hydraulically connected to an oil hydraulic pressure source (not illustrated) through an oil supply/discharge passage 18, a connection fitting 19 and a hydraulic hose 20. A piston return spring 21 comprising a compression spring is provided within the spring chamber 16.

The clamp rod 6, as the member to be forced for clamping, has a passive portion 25 formed at the upper side of a through portion 24 thereof to be inserted into the cylinder body 5. The passive portion 25 is formed larger in diameter than the through portion 24.

Next, the clamping force switching means 8 will be explained.

It has a truncated corn shaped clamping means 27 placed on the upper surface of the piston 12, a retracting means 30 provided within the clamping means 27 so as to spread the clamping means 27 expansively and an advancement slant cam 31 kept in contact with the outer peripheral surface of the clamping means 27 from the upper side thereof, and it is constructed as shown in FIG. 1(a) and FIGS. 3 through 7.

The clamping means 27 comprises three divided clamping members 27a, 27a, 27a, of which inner peripheral surfaces form a clamp rod passage D which extends vertically. The respective clamping members 27a are adapted to be displaced expansively and contractively in the radial direction of the clamp rod passage D through a guide means 33. A guide ring 34 is placed on the peripheral edge portion of the upper surface of the piston 12. A ring-shaped spring retainer 36 is abutted to an intermediate shoulder portion of the cover plate 10. The piston return spring 21 is mounted between the spring retainer 36 and the guide ring 34, and the guide ring 34 is adapted to move synchronously together with the vertical movement of the piston 12. Guide grooves 35 are provided in the outer peripheral lower portions of the respective clamping members 27a so as to extend in the peripheral direction thereof 27a, and the inner peripheral edge of the guide ring 34 is fitted within the guide groove 35 radially slidably.

The retracting means 30 is constructed as follows.

The neighboring clamping member 27a, 27a of the clamping means 27 are provided with spring retaining holes 38, 38 which extend opposingly each other in the tangential direction, and into which a positioning pin 39 is inserted. A retracting spring 41 comprising a compression spring is mounted between the bottom wall of each spring retaining hole 38 and a spring retaining seat 40 formed by enlarging the middle of the positioning pin 39.

The advancement slant cam 31 is formed in a cylindrical configuration and has a cam surface 43 formed by an inner peripheral surface of which diameter gets larger gradually as descending downwardly. A flange portion 44 is protruded from the upper portion of the peripheral wall of the advancement slant cam 31 outwardly in the diametrical direction thereof, and the flange portion 44 is abutted against the upper surface of the spring retainer 36. Further, a cam restoring spring 47 comprising a compression spring is provided between the upper wall of the cover plate 10 and a cylindrical spring retainer 46 placed on the upper surface of the advancement slant cam 31. The resilient force of the cam restoring spring 47 is settled weaker than that of the piston returning spring 21.

As shown in FIG. 2, an allowable stroke L of the piston 12 within the cylinder body 5 is settled not less than a value obtained by summing up a clamping actuation lift, i.e. the distance M, and a clamping means advancing lift, i.e. the distance N.

While the piston 12 is actuated from the lower side of the cylinder body 5 to the upper side thereof through the distance of the clamping means advancing lift N for a clamping means advancing actuation, the clamping means 27 is adapted to be advanced by the advancement slant cam 31 against the retracting spring 41 from a retracted position Y to an advanced position X.

On the one hand, while the piston 12 is actuated upwardly through the distance of the clamping actuation lift M provided at the upper side beyond the clamping means advancing lift N for a clamping actuation, a piston output portion 12a synchronously moving with the piston 12 is adapted to actuate the clamping means 27 from an unclamped position U to a clamped position C.

The switching from the unclamped condition shown in FIG. 2(a) to the clamped condition shown in FIG. 2(c) is carried out according to the following sequence.

Figure 5:
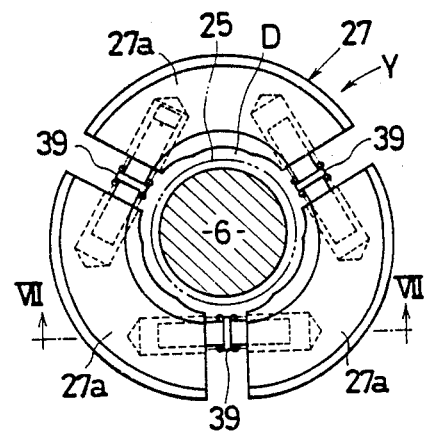
Figure 7:
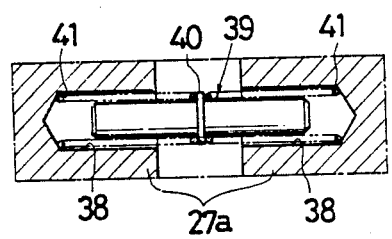

As shown in FIG. 2(a), under such a condition that the pressure oil is discharged from the clamping actuation oil chamber 15 so as for the piston 12 to be lowered by the spring force of the piston returning spring 21, the respective clamping members 27a of the clamping means 27 are moved expansively by the retracting spring 41 of the retracting means 30 along the guide ring 34 so that the clamping means 27 is switched over to the unclampable retracted position Y (refer to FIG. 5 and FIG. 7). Under this unclamped condition, the clamp rod passage D is opened, the diameter of the inner peripheral surface of the clamping means 27 gets larger than the outer diameter of the passive portion 25 so that the passive portion 25 can pass through the clamp rod passage D.

Figure 4:
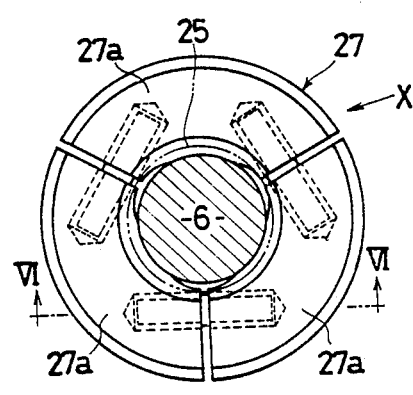
Figure 6:
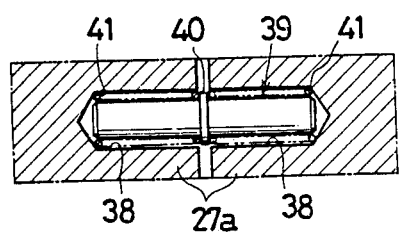

As shown in FIG. 2(b), when the piston 12 is actuated upwardly by the pressure oil supplied to the clamping actuation oil chamber 15, the outer peripheral surfaces of the clamping members 27a of the clamping means 27 are adapted to be pushed inwardly through the cam surface 43 of the advancement slant cam 31 by the former stage of the ascending actuation force which ascendantly actuates the piston 12 to the extent of the lift N so that the clamping means 27 can shift contractively to the clampable advanced position X along the guide ring 34 with compressing the retracting spring 41 (refer to FIG. 4 and FIG. 6). Therefore, the clamp rod passage D is narrowed so as to take such a switching transitive condition that the transmission surface 28 composed of the upper end surfaces of the clamping members 27a opposes to the lower surface of the passive portion 25.

Further, when the piston 12 is actuated upwardly to the extent of the lift M, the clamped condition as shown in FIG. 2(c) is attained. That is, the clamping means 27 is moved upwardly by the latter stage of the ascending actuation force for the piston 12 against the resilient force of the cam restoring spring 47 while the clamping means 27 is kept in the clampable advanced position X so that the transmission surface 28 of the clamping member 27a can abut against the lower surface of the passive portion 25. Therefore, the hydraulic pushing-up force of the piston 12 is transmitted to the passive portion 25 through the clamping means 27 so that the clamp rod 6 is actuated upwardly for clamping and the clamped condition is attained.

On the other hand, the switching from the clamped condition shown in FIG. 2(c) to the unclamped condition shown in FIG. 2(a) is carried out in a reversed sequence with respect to the above-mentioned one. In this case, while the piston 12 is actuated from the upper side to the lower side through the distance of the lift N for a clamping means retracting actuation, the guide ring 34 separates the respective clamping members 27a from the advancement slant cam 31 so as to lower the clamping means 27.

The present invention functions as follows.

As shown in FIG. 2, when the clamping means 27 is switched over from the unclamped condition shown in FIG. 2(a) to the clamped condition shown in FIG. 2(c) through the switching transitive condition shown in FIG. 2(b), first of all the clamping means 27 actuated by the piston 12 is guided by the advancement slant cam 31 and shifted contractively substantially uniformly about the axis A of the hydraulic cylinder 4. Then, the transmission surface 28 provided in the upper end of the clamping means 27 is brought in contact with the underside of the passive portion 25 so as to actuate the passive portion 25 for clamping.

When the clamping means 27 is switched over from the unclampable retracted position Y to the clampable advanced position X, since the clamping means 27 is shifted contractively substantially uniformly about the axis A and the transmission surface 28 is provided throughout the whole periphery of the passive portion 25, the open range incapable of transmission can be lessened and a large transmission area can be obtained. Therefore, the transmission capability of the clamping means 27 gets increased and the clamping capability of the hydraulic clamp 3 is enhanced.

Since the transmission area of the transmission surface 28 of the clamping means 27 is large as mentioned above, the pressure per unit area in the contact surfaces of the clamping means 27 and the passive portion 25 is decreased. Furthermore, since the transmission surface 28 is provided substantially uniformly along the whole periphery of the passive portion 25, a stress concentration or a bending stress is hardly generated in the clamp rod 6. Accordingly, the durability of the clamp rod 6 is enhanced.

Further, since the clamping means 27 is directly switched by the piston 12 of the hydraulic cylinder 4, a switching actuation device used only for the clamping force switching means 8 can be omitted. Furthermore, since the operational sequence between the positional switching operation and the clamp/unclamp actuating operation of the clamping means 27 can be classified respectively by the former stage of the ascending actuation force and the latter stage of the ascending actuation force for the piston 12, also a control device used only for such an operation control can be omitted. Since the switching actuation device as well as the control device can be omitted in that way, the whole construction of the hydraulic clamp 3 can be simplified.

FIGS. 8 through 14 show the variant examples of the hydraulic clamp 3. Constructions different from the above first embodiment will be explained. And component members having the same functions as the ones in the first embodiment are indicated by the same symbols as a rule.

(First Variant Example)

Figure 8C:
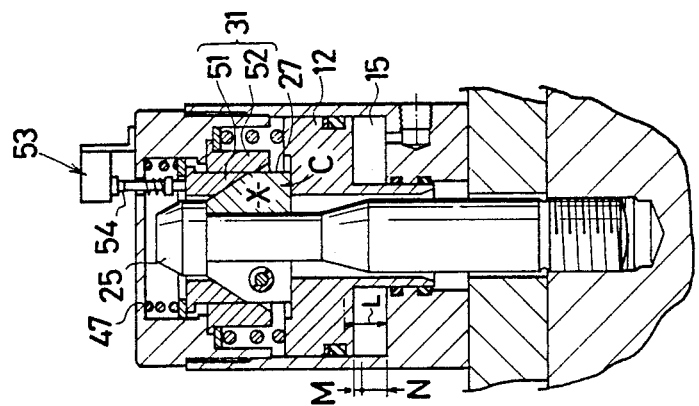
Figure 8B:
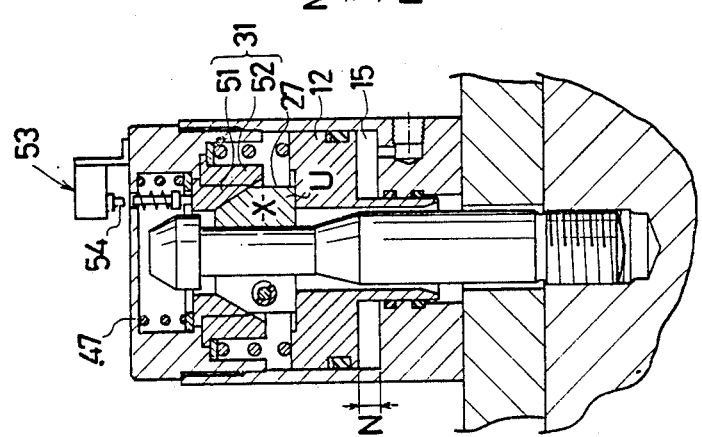
Figure 8A:
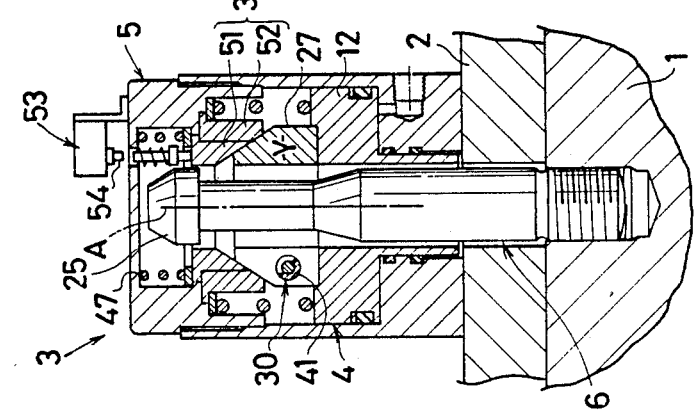

FIG. 8 shows the first variant example and is a view corresponding to FIG. 2.

In this case, the advancement slant cam 31 comprises an inside cam 51 and an outside cam 52. The outside cam 52 is fixedly secured to the cylinder body 5 and the inside cam 51 is supported by the outside cam 52 vertically slidably in the direction of the axis A of the hydraulic cylinder 4. And the inside cam 51 is resiliently biased downwardly by the cam restoring spring 47 mounted on the inside cam 51.

Under the clamping means advancing actuation condition wherein the piston 12 is actuated from the lower side to the upper side through the distance of the clamping means advancing lift N, the clamping means 27 is adapted to be shifted contractively with being guided by the outside cam 52 from the unclampable retracted position Y to the clampable advanced position X.

Under the clamping actuation condition wherein the piston 12 is actuated from the lower side to the upper side through the distance of the clamping actuation lift M and the clamping means 27 is actuated from the unclamped position U to the clamped position C, the clamping means 27 is adapted to push and move the inside cam 51 to the upper side against the cam restoring spring 47.

A contact 54 of a limit-switch 53 for detecting the clamped position C is presented at the upper surface of the inside cam 51. Therefore, the switching over of the hydraulic clamp 3 to the clamped condition can be detected and the positive fixation of the member 2 to be clamped can be confirmed.

(Second Variant Example)

Figure 9:
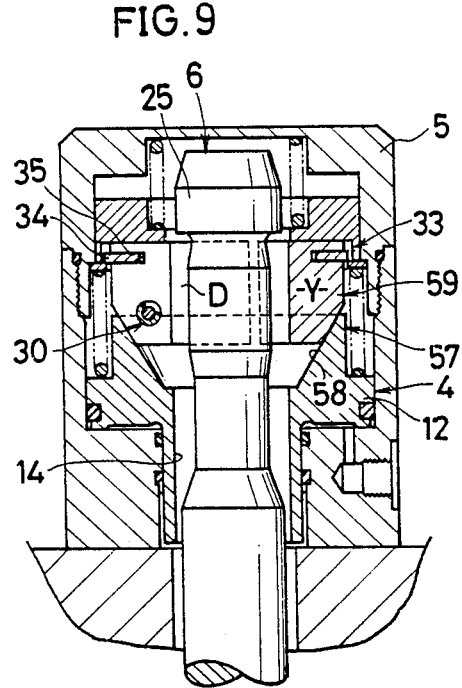

FIG. 9 shows the second variant example, in which a cylindrical advancement slant cam 57 is protruded from the upper surface of the piston 12. A downwardly tapering clamping means 59 is engaged with the upwardly enlarging conical cam surface 58 of the cam 57.

(Third Variant Example)

Figure 10:
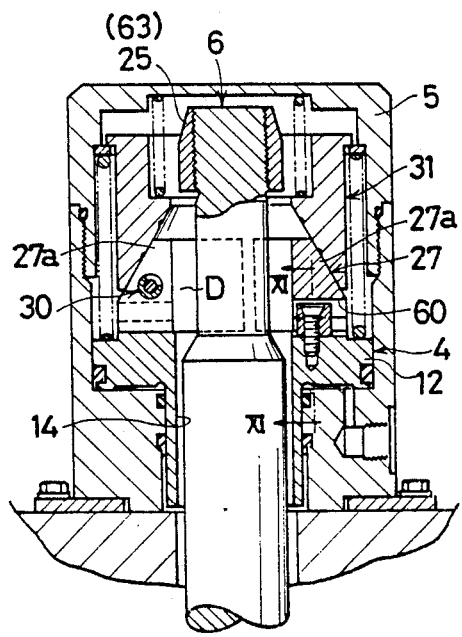
Figure 11:
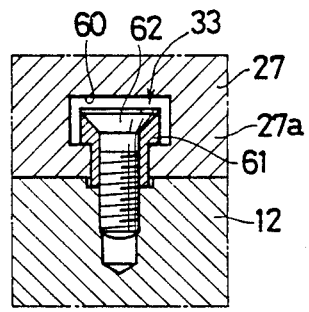

FIGS. 10 and 11 show the third variant example, which is embodied by modifying the guide means 33 as follows.

T-shaped grooves 60 which extend in the radial direction are formed in the lower portions of the respective clamping members 27a of the clamping means 27. T-shaped blocks 61 are fixedly secured to the upper portion of the piston 12 by means of flat head screws 62 so as to be slidably fitted in the T-shaped grooves 60 for guiding the radial slide of the clamping means 27. The passive portion 25 of the clamp rod 6 is composed of a nut 63 threadably secured to the upper end portion of the clamp rod 6.

(Fourth Variant Example)

Figure 12:
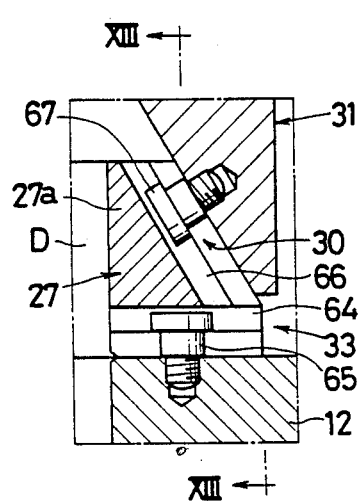
Figure 13:
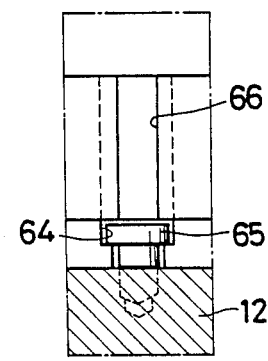

FIGS. 12 and 13 show the fourth variant example, which is embodied by modifying the guide means 33 as follows.

The head portion of the pin 65 for horizontally guiding is slidably fitted in the T-shaped groove 64 of the clamping means 27 and the foot portion of the guide pin 65 is threadably fixed to the upper portion of the piston 12. Instead of the above-mentioned retracting spring 41, the retracting means 30 is constructed as follows. That is, T-shaped grooves 66 for expansive shift are provided in the peripheral walls of the respective clamping members 27a of the clamping means 27 so as to extend downwardly. The head portion of the pin 67 for expansive actuation is slidably fitted in the T-shaped groove 66 and the foot portion of the pin 67 is threadably secured to the cam 31.

(Fifth Variant Example)

Figure 14:
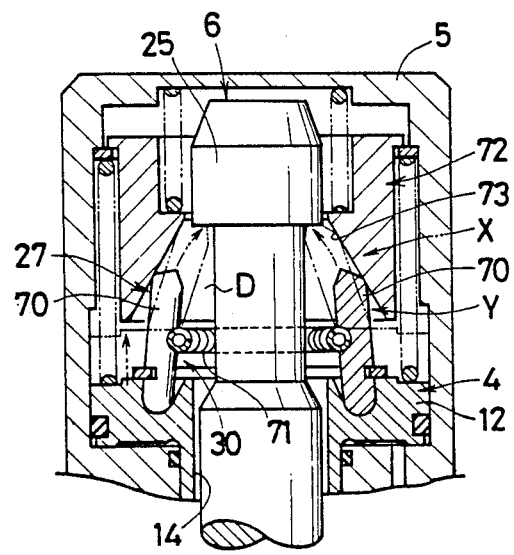

FIG. 14 shows the fifth variant example.

In this case, the clamping means 27 comprises a plurality of clamping rods 70, of which lower portions are supported pivotably by the upper portion of the piston 12. An expansively actuating coil spring 71 as the retracting means 30 is mounted in the inside middle portions of the rods 70 so that the upper end portions of the rods 70 are brought in contact with a cam surface 73 of an advancement slant cam 72. And when the piston 12 is ascendantly moved, the upper end portions of the rods 70 are adapted to be guided so as to move radially inwardly along the cam surface 73 and to engage with the passive portion 25 transmittably.

FIGS. 15 through 32 show other embodiments.

Second Embodiment

Figure 15:
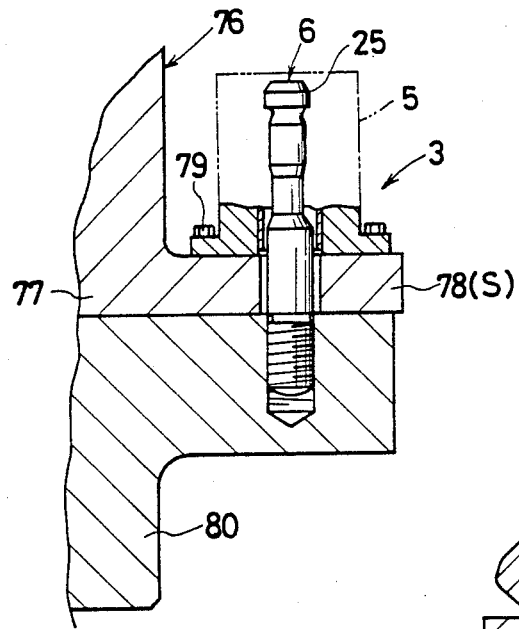

FIG. 15 shows the second embodiment.

In this embodiment, there is provided a flange 78 as a cylinder supporting member S in an output end portion of a slide 76 of a press machine as the fixed member. The cylinder body 5 of the hydraulic clamp 3 is fixedly secured on the upper surface of the flange 78 by a plurality of bolts 79. And the clamp rod 6 is threadably secured to the upper surface of an upper molding die 80 as the member to be clamped. When the upper molding die 80 is mounted to the slide 76, first of all the slide 76 is so lowered that the cylinder body 5 kept in the unclamped condition is inserted into with the upper half of the clamp rod 6, and then the hydraulic clamp 3 is operated so as to get in the clamped condition.

Third Embodiment

Figure 16:
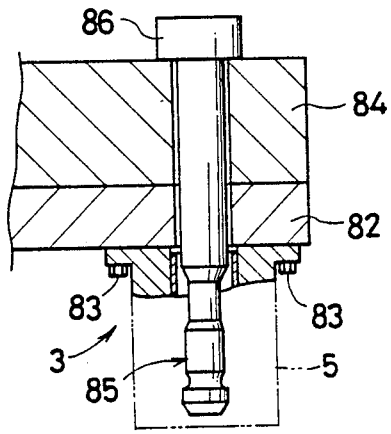

FIG. 16 shows the third embodiment.

In this embodiment, the cylinder body 5 is fixedly secured to the underside of a fixed member 82 by a plurality of bolts 83. A clamp rod 85 is inserted into both the fixed member 82 and a member 84 to be clamped which is kept placed on the fixed member 82 from their upper side so that the lower half portion of the clamp rod 85 is inserted into the cylinder body 5. And then, the hydraulic clamp 3 is operated so as to get in the clamped condition. By the way, the clamp rod 85 is adapted to be supported by the upper surface of the member 84 to be clamped, through a stopper portion 86 formed by enlarging the upper end of the clamp rod 86 in diameter.

Fourth Embodiment

Figure 17:
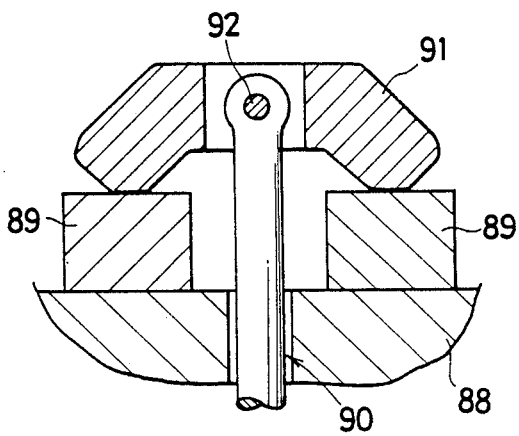

FIG. 17 shows the fourth embodiment.

In this embodiment, a clamp arm 91 pivotably supported by the upper end of the clamp rod 90 is adapted to press a plurality of members 89, 89 to be clamped which are placed on the upper surface of the fixed member 88. The symbol 92 is a pivot pin.

Fifth Embodiment

Figure 18:
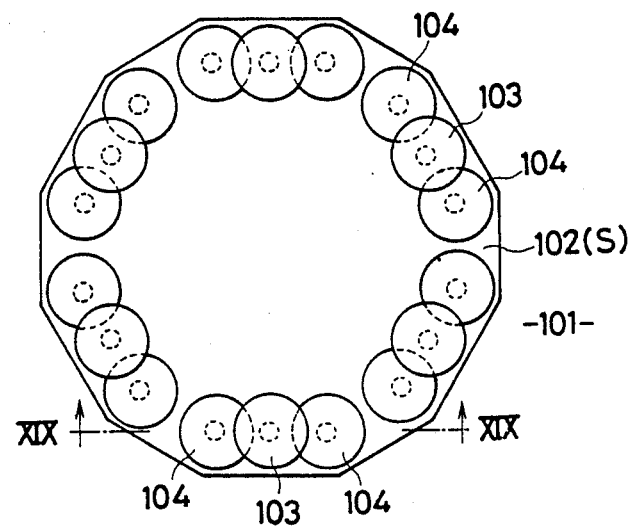
Figure 20:
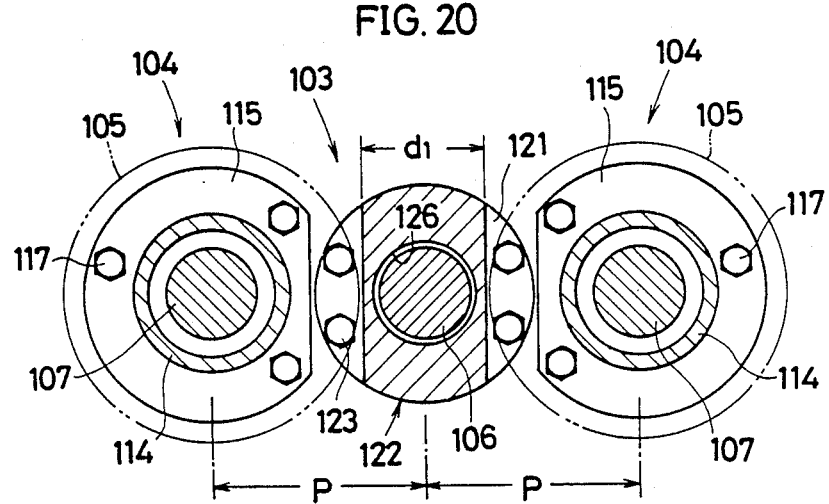
Figure 19:
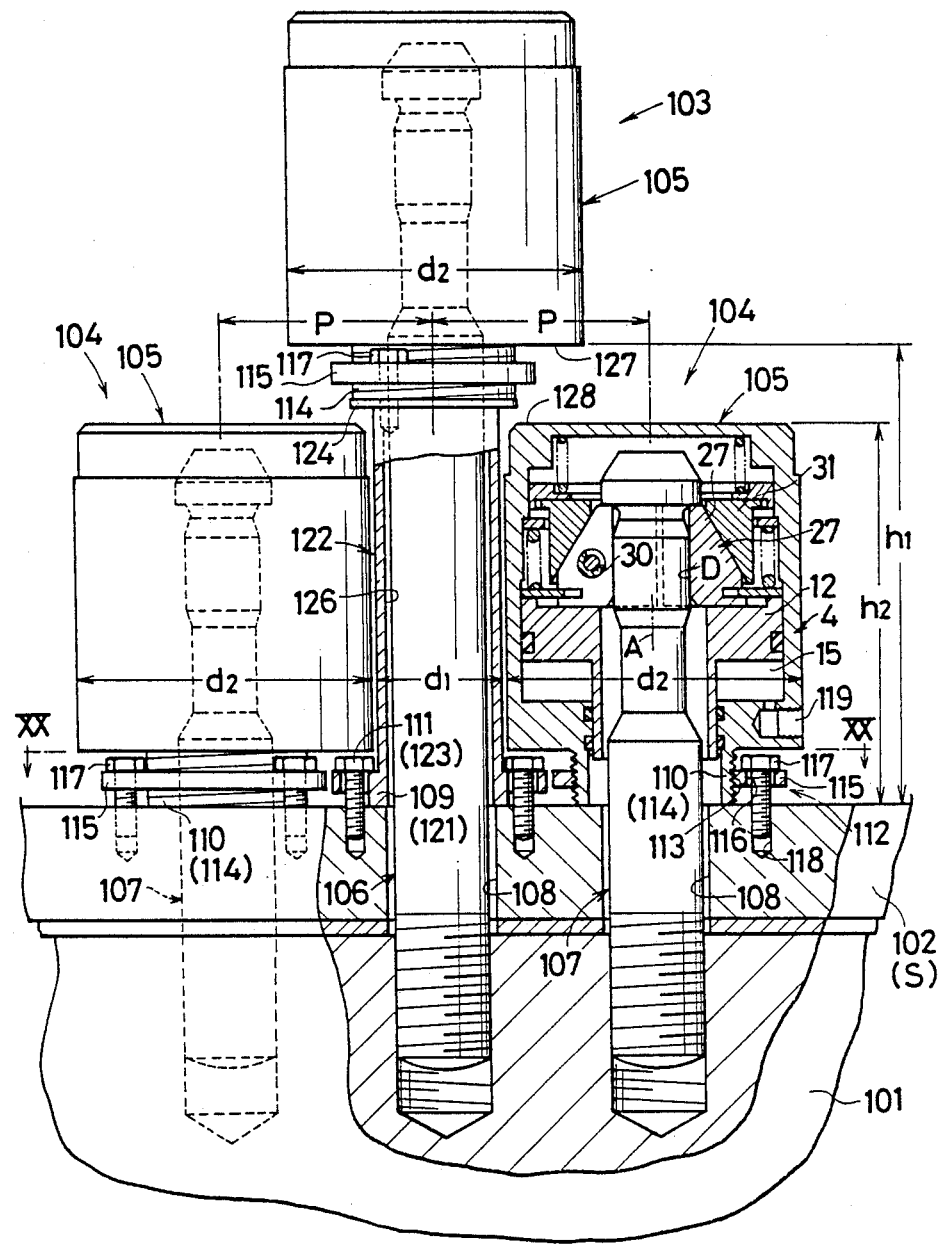

FIGS. 18 through 20 show the fifth embodiment.

In FIG. 18, a cover plate 102 as a member to be clamped is adapted to be fixedly secured to the upper surface of a pressure container body 101 as a fixed member by means of a large number of hydraulic clamps 103, 104. The cover plate 102 serves as the cylinder supporting member S and is formed in a polygonal figure in plan view. One set of three hydraulic clamps 103, 104, 104 are arranged linearly on the cover plate 102 along the respective sides thereof 102.

One hydraulic clamp 103 disposed at the middle among three hydraulic clamps has a cylinder body 105 and a long clamp rod 106, and the other hydraulic clamps 104, 104 disposed at the opposite sides have the same cylinder bodies 105 and short clamp rods 107 respectively. These cylinder bodies 105 and clamp rods 106, 107 are constructed the same as the ones employed in the first embodiment (refer to FIGS. 1 through 7), and the component members having the same construction are indicated by the same symbols.

The clamp rods 106, 107 is threadably secured in a predetermined pitch to the upper peripheral edge portion of the pressure container body 101, and a large number of through holes 108 for the clamp rods are provided in the peripheral edge portion of the cover plate 102 corresponding to those clamp rods 106, 107. The respective mounting portions 109, 110 provided in the base ends of the hydraulic clamps 103, 104 are fixedly secured to the upper edge portions of the respective through holes 108 by respective fixing means 111, 112.

The manipulation for mounting the cover plate 102 to the pressure container body 101 is carried out according to the following sequence. First of all, the cover plate 102 is so lowered that the through holes 108 of the cover plate 102 and the clamp rod passage D within the cylinder body 105 are inserted into with the clamp rods 106, 107. Then, a pushing-up force is applied to the clamp rods 106, 107 through the clamping means 27 by the hydraulic pressure of the hydraulic cylinder 4, and the cover plate 102 is pressedly fixed to the pressure container body 101 by a reaction force which is exerted from the clamp rods 106, 107 to the respective cylinder bodies 105.

Next, the fixing means 111, 112, will be explained.

A flange fitting portion 114 is formed by narrowing the lower portion of each cylinder body 105. A mounting flange 115 is adapted to be fitted to the flange fitting portion 114 from the lower side and turned adjustably thereabout so as to be threadably engaged with the flange fitting portion 114 at the middle height thereof. The annular portion of the mounting flange 115 is provided with a plurality of mounting holes 116 which extend vertically and are arranged in the peripheral direction thereof 115, and mounting bolts 117 are fitted in the mounting holes 116.

In the other hydraulic clamp 104, the mounting portion 110 is constructed by the flange fitting portion 114, and the fixing means 112 is constructed by the mounting flange 115 the mounting bolts 117. And the flange fitting portion 114 is fixedly pressed downwardly through the mounting flange 115 by a tightening force, which is applied to the mounting bolts 117 threadably engaged with threaded holes 118 of the cover plate 102.

In the one hydraulic clamp 103, a cylindrical prop 122 is interposed between the cylinder body 105 and a lower flange 121 as the mounting portion 109, and the prop 122 and the cylinder body 105 of the other hydraulic clamp 104 are arranged side by side each other. The peripheral edge of the mounting flange 115 of the other hydraulic clamp 104 is partially cut away so as to prevent the interference with the lower flange 121 of the hydraulic clamp 103 (perfer to FIG. 20). The lower flange 121 is fixedly secured to the cover plate 102 by means of bolts 123 as the fixing means 111. And the flange fitting portion 114 of the clamp body 105 is fixedly secured to the upper flange 124 of the prop 122 through the mounting flange 115 and the moungting bolts 117. And a long clamp rod 106 is inserted into the cylindrical hole 126 provided in both the lower flange 121 and the prop 122.

The lateral dimension of the prop 122, namely the width $d_1$ thereof in the arrangement direction of both hydraulic clamps 103, 104 is settled smaller than the width (the dimension of the outer diameter) $d_2$ of the cylinder body 105. And the height of the prop 122 is so settled that the height ($h_1$) of the lower end surface 127 of the cylinder body 105 of the one hydraulic clamp 103 gets higher than the height ($h_2$) of the upper end surface 128 of the cylinder body 105 of the other hydraulic clamp 104. Therefore, the lower end surface 127 of the cylinder body 105 of the one hydraulic clamp 103 is located so as to overlap the upper end surface 128 of the cylinder body 105 of the other hydraulic clamp 104.

According to the above-mentioned construction, the mounting pitch P for the hydraulic clamps 103, 104 can be settled so as to get shorter by the overlap dimension between the neighboring cylinder bodies 105, 105 than the width dimension $d_2$ of the cylinder body 105. Therefore, the mounting number of the hydraulic clamps 103, 104 per unit space is increased and the total clamping force of the clamp apparatus gets larger.

Since the clamp apparatus can be equipped with so many small hydraulic clamps 103, 104 that a predetermined total clamping force is obtained, the width dimension of a row of clamps can be made small as well as the whole of the clamp apparatus can be made small.

The setting up of the mounting flange 115 to the cylinder body 105 of the other hydraulic cylinder 104 is carried out as follows for example.

Previously, the mountig bolts 117 are inserted into the mounting holes 116 of the mounting flange 115 from the upper side thereof and kept hung freely. While the bolts 117 are kept hung in that way, the mounting flange 115 is fitted to the flange fitting portion 114 from the lower side thereof and engaged with the flange fitting portion 114 at a predetermined height thereof through a stopper means 113 composed of threaded fitting portions.

The manipulation for mounting the cylinder body 105 to the cylinder supporting member S is carried out as follows.

First of all, the cylinder body 105 as mentioned above is placed on the cylinder supporting member S and the foot of each mounting bolt 117 is directed and screwed lightly into the threaded hole 118 of the cylinder supporting member S. And then the cylinder body 105 is turned adjustably about the vertical axis thereof with respect to the mounting flange 115 so as to settle a pipping connecting port 119 in a suitable direction.

Next, the flange fitting portion 114 is pressedly fixed to the cylinder supporting member S through the mounting flange 115 as well as the stopper means 113 composed of the threaded fitting portions by the tightening of the mounting bolts 117.

When the mounting holes 116 are provided in the mounting flange 115, the flange projecting width required for the mounting hole 116 is settled in such a width as less than the radius of the cylinder body 105 as well as not less than the radius of the flange fitting portion 114. Accordingly, since the mounting flange 115 doesn't project outside the cylinder body 105, the outer diameter of the hydraulic claim 103 can be kept small.

There is provided such a small space that the heads of the mounting bolts 117 can be accommodated between the upper surface of the mounting flange 115 and the lower surface of the cylinder body 105. In this case, it is not necessary to provide a large space for putting in the bolts 117. Therefore, the length of the flange fitting portion 114 can be shortened and the total height of the hydraulic clamp 103 can be kept small.

Incidentally, in this embodiment, in case that the peripheral portion of the upper end surface 128 of the cylinder body 105 of the other hydraulic clamp 104 is so concaved that the cylinder body 105 of the hydraulic clamp 103 can be lowered, the height ($h_1$) can be made lower than the height ($h_2$).

In spite that the fixing means 111 of the one hydraulic clamp 103 is composed of the bolts 123 as well as the fixing means 112 of the other hydraulic clamp 104 is composed of the mounting flange 115 and the mounting bolts 117, these fixing means 111, 112 may be constructed so as to enable the mounting portions 109, 110 to be directly threadably engaged with the cylinder supporting member S, to be connected thereto through couplings or to be fixedly secured thereto by means of welding.

Futher, the cover plate 102 may be formed in a circular shape as well as the hydraulic clamps 103, 104 may be arranged alternatively.

Figure 21:
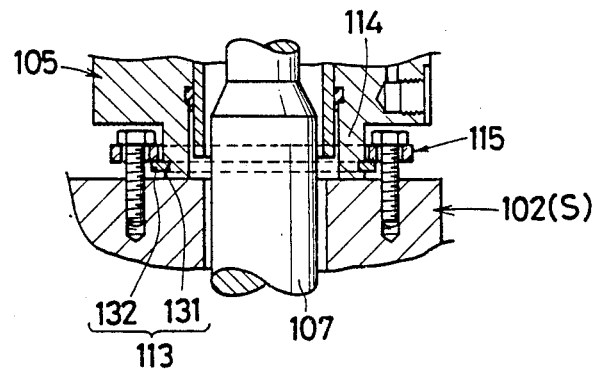
Figure 22:
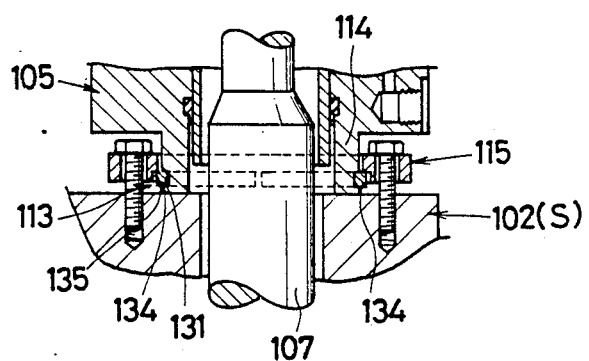

FIG. 21 and FIG. 22 show variant examples of the stopper means 113 respectively.

(First Variant Example)

FIG. 21 shows the first variant example of the stopper means 113. In this example, the outer surface of the flange fitting portion 114 and the inner surface of the mounting flange 115 are formed straigth. A peripheral groove 131 is provided in the flange fitting portion 114 at the middle position thereof so that a stopper ring 132 is fitted in the peripheral groove 131. The stopper means 113 is composed of these peripheral groove 131 and stopper ring 132.

(Second Variant Example)

FIG. 22 shows a second variant example of the stopper means 113. In this example, a plurality of stopper members 134 arranged in the peripheral direction are fitted in the peripheral groove 131 of the flange fitting portion 114. The stopper members 134 are fitting in a stopper step 135 of the mounting flange 115 as well as in the peripheral groove 131.

Sixth Embodiment

FIGS. 23 through 28 show the sixth embodiment.

FIG. 23 shows the hydraulic clamp applied for detachably mounting a cylinder head of an injection molding machine. A cylinder head 202 has a flanged member to be clamped is detachably fixed to the right surface of a screw cylinder 201 as a fixed member of the injection molding machine by a hydraulic clamp 203 so that molten resin can be injected from a nozzle 202a of the cylinder head 202 by means of a screw 201a inserted within the screw cylinder 201. The hydraulic clamp 203 has a cylinder body 205 of a hydraulic cylinder 204 fixedly secured to the right end surface of the screw cylinder 201 by a plurality of fixing bolts 206. And a clamping means 227 is adapted to be operatively pushed by the hydraulic pressure of the hydraulic cylinder 204 so as to fixedly press an outer flange portion 207 as a passive portion of the cylinder head 202 to the screw cylinder 201.

The hydraulic cylinder 203 comprises a clamping actuation oil chamber 215, a piston 212 and the clamping means 227 arranged in order between the one end wall (the right end wall in the drawings and the same hereinafter) and the other end wall (the left end wall in the drawings and the same hereinafter) of the cylinder body 205 and has construction similar to the above-mentioned first embodiment.

The hydraulic clamp 203 operates as follows.

At the time of the clamping/unclamping operation of the hydraulic clamp 203, the clamping means 227 is adapted to be switched over as shown in FIGS. 24(a), (b), (c).

Figure 25:
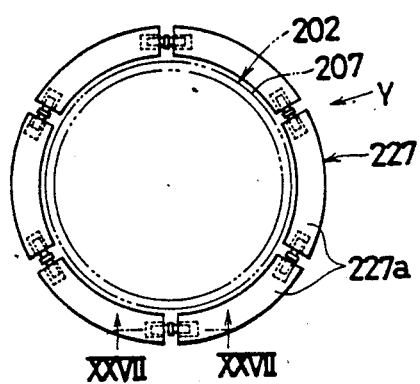

FIG. 24(a) shows the unclamped condition, wherein the piston 212 is retracted to the right end wall side of the cylinder body 205 so that the clamping means 227 is switched over to the retracted position Y by a retracting spring 241 of a retracting means 230 (refer to FIG. 25).

Figure 26:
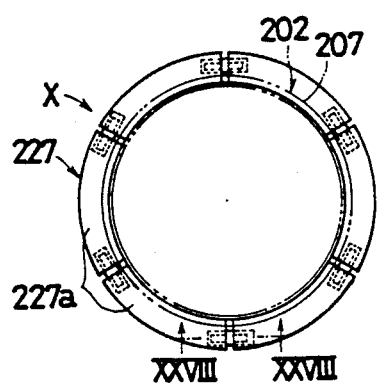
Figure 27:
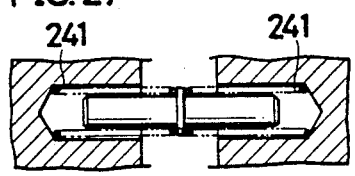
Figure 28:
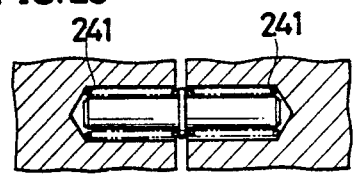

FIG. 24(b) shows the switching transitive condition, wherein the piston 212 is actuated to the left side by the clamping means advancing lift N so that the clamping means 227 is switched over to the clampable advanced position X by an advancement slant cam 231 (refer to FIG. 26).

FIG. 24(c) shows the clamped condition, wherein the piston 212 is actuated further to the left side so that the clamping means 227 performs a clamping operation, namely so that the outer flange portion 207 of the cylinder head 202 as the member to be clamped is pressedly fixed between the clamping means 227 and the screw cylinder 201 as the fixed member.

At the time of the mounting of the cylinder head 202, the cylinder head 202 is set on the mounting surface of the screw cylinder 201 with held in the cylinder body 205 under the condition shown in FIG. 24(a). When the hydraulic cylinder 204 is hydraulically actuated, the clamping means 227 is switched over automatically from the retracted position Y to the clampable advanced position X interlockingly with the movement of the piston 212 during the switching over from the condition shown in FIG. 24(a) to the condition shown in FIG. 24(b), and then the clamping means 227 is moved to the left side so as to perform the clamping during the switching over from the condition shown in FIG. 24(b) to the condition shown in FIG. 24(c).

At the time of the dismounting the cylinder head 202, the clamping means 227 is adapted to be switched over from the condition shown in FIG. 24(c) to the condition shown in FIG. 24(a) via the condition shown in FIG. 24(b) in the reversed sequence with respect to the above-mentioned sequence by the restoring operation of the hydraulic cylinder 204. Thereupon, the clamping means 227 is retracted to the retracted position Y by means of the retracting spring 241. Therefore, the cylinder head 202 can be dismounted from the screw cylinder 201 unless the outer flange portion 207 is caught in the clamping means 227.

Since the clamping means 227 is switched over interlockingly with the movement of the piston 212 of the hydraulic cylinder 204, it becomes unnecessary to manipulate the clamping means 227 manually and it becomes easy to perform the clamping by the hydraulic clamp 203.

Since it is enough to provide only one set of hydraulic clamp 203 as well as hydraulic pipings corresponding thereto, it is also enought to provide one set of actuation detecting means in the case that a clamping/unclamping operation is designed so as to be detected. Therefore, the whole clamp apparatus can be simplified in construction.

Further, since the hydraulic clamp 203 doesn't project largely in the radial direction from the fixing location of the cylinder head 202 as the member to be clamped, its outer diameter can be kept small and it can be manufactured in a small size.

Since the clamping means 227 is arranged in the peripheral direction of the outer flange portion 207 of the cylinder head 202, an unclampable range gets less as well as a clamping force per unit area gets larger. Accordingly, when obtaining a predetermined clamping forece, the outer flange portion 207 can be prevented from being damaged and deformed because a force per unit area exerted from the clamping means 227 to the outer flange portion 207 gets smaller.

Further, since the clamping operation is performed by only one set of hydraulic clamp 203, the outer flange portion 207 can be tightened substantially simultaneously uniformly throughout the periphery thereof and uneven tightening for the outer flange portion 207 can be prevented.

FIGS. 29 through 32 show futher other embodiments, in which component members having the same functions as the ones in the above-mentioned sixth embodiment are indicated by the same symbols.

Seventh Embodiment

Figure 29:
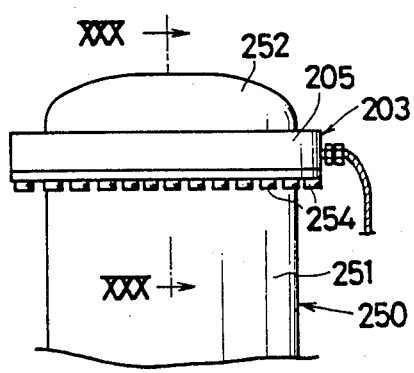
Figure 30:
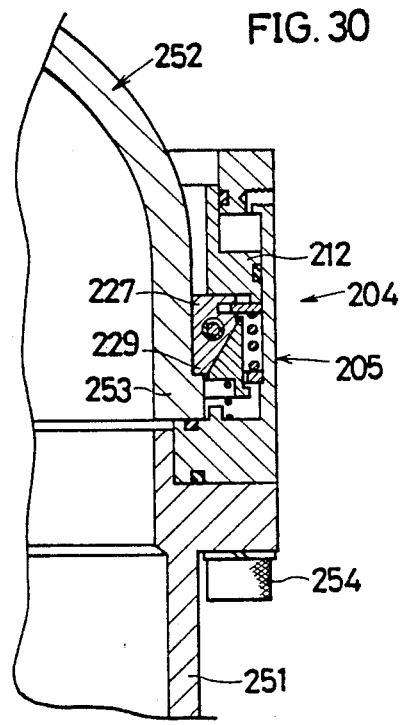

FIGS. 29 through 30 show the seventh embodiment.

In this embodiment, an end plate 252 as a flanged member to be clamped of an autoclave 250 is adapted to be detachably mounted to a trunk portion 251 as a fixed member thereof by means of a hydraulic clamp 203. A cylinder body 205 of a hydraulic cylinder 204 is fixedly secured to the trunk portion 251 of the autoclave 250 by a plurality of fixing bolts 254. By hydraulically actuating the piston 212 with a hydraulic pressure of the hydraulic cylinder 204, a flange portion 253 of the end plate 252 is adapted to be pressedly secured to the cylinder body 205 through an output portion 229 of the clamping means 227.

Eighth Embodiment

Figure 31:
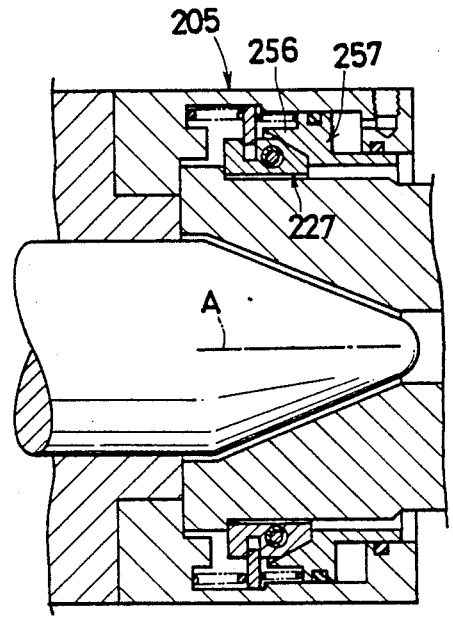

FIG. 31 shows the eight embodiment.

FIG. 31 is a view corresponding to FIG. 23, in which an advancement slant cam 256 is protruded from the left side of a piston 257, and the clamping means 227 is provided within a space at the left side of the advancement slant cam 256.

Ninth Embodiment

Figure 32:
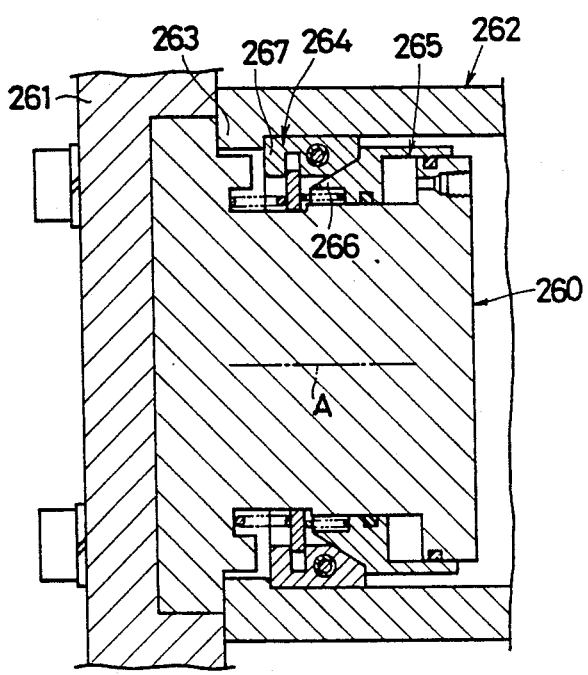
Figure 33:
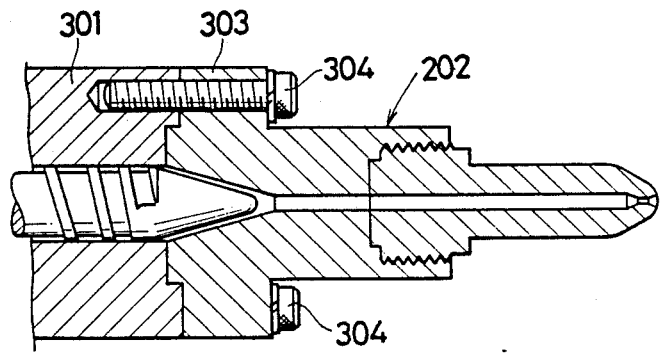
FIG. 33 shows a conventional embodiment and is a sectional view showing a clamped condition of a member to be clamped.

FIG. 32 shows the ninth embodiment. This is obtained by modifying the one shown in FIG. 31 and so constructed that the clamping means can be located in the unclampable retracted position under its contracted condition and located in the clampable advanced position under its expanded condition. That is, a solid cylinder body 260 is fixedly secured to a fixed stand 261 as the fixed member, and there are provided a clamping means 264, a piston 265 and an advancement slant cam 266 in the outer peripheral portion thereof 260. A cylindrical member 262 to be clamped is placed about the cylinder body 260 in an inserted manner and an inner flange portion 263 thereof 262 is pressedly secured to the fixed stand 261 by the output portion 267 of the clamping means 264.

The piston may be formed in a square-tube configuration instead of the cylindrical configuration in the above-mentioned embodiments. And the clamping means may be so constructed that it can be switched over positionally in the radial direction of the piston by the advancement slant cam or constructed integrally instead of a plurality of clamping members arranged in an annular state in the above-mentioned embodiments. Further, instead of a plurality of retracting springs in the above-mentioned embodiments, the retracting means may be so constructed that it can resiliently retract the clamping means in the radial direction, for example it may be constructed by a clamping means itself made of such a material as having an elastic restoring force.

In this disclosure, there are shown and described only the preferred embodiments of the invention, but, as aforementioned, lit is to be understood that the invention is capable of use in various other combinations and environments and is caple of changes or modifications within the scope of the inventive concept as expressed herein.

I claim:

1. A hydraulic clamp including a hydraulic cylinder, comprising:
    a clamping actuating oil chamber, a piston and a clamping means arranged in order between a first end of a cylinder body of said hydraulic cylinder and a second end thereof;
    said clamping means being constructed so that at least a clamping means output portion, provided at the second end side, can be shifted expansively and contractively between an advanced clamping position and a retracted unclamping position at predetermined different distances from an axis of the hydraulic cylinder, the clamping means being adapted to be displaceable between an unclamped position and a clamped position along the axis of the hydraulic cylinder in the advance position,
    said clamping means being adapted to be urged to the retracted position by a means for retracting the same and to be pushed to the advanced position by a cam member having a slant surface for advancing the clamping means,
    an allowable stroke of said piston within the cylinder body being not less than a value obtained by the sum of a clamping actuation lift distance for clamp actuation and a clamping means advancing lift distance for advancing the clamping means,
    said clamping means being further adapted to be advanced by the cam member from the retracted position to the advanced position under a clamping means advancing actuation condition upon the piston being actuated from the first end side of the cylinder body to the second end side thereof through the clamping means advancing lift distance, and
    said clamping means being also adapted to be pushed from the unclamped position to the clamped position by a piston output portion moving together with the piston under the clamping actuation condition upon the piston being actuated toward the second and side of the cylinder through the clamping actuation lift distance at the second end side beyond the clamping means advancing lift distance.

2. A hydraulic clamp as recited in claim 1, wherein:
    the clamping means comprises a plurality of clamping members arranged in an annular shape,
    with peripheral guide grooves provided therein for the guidance of the clamping members during said expansive and contractive shifts thereof, and a guide ring for the guidance of expansive and contractive shifts that is fitted to be slidable radially into the peripheral guide grooves so that the guide ring guides the respective clamping members in parallel from the retracted position to the advanced position under the clamping means advancing actuation condition when the piston is actuated from the first end side to the second end side through the clamping means advancing lift, and,
    conversely, the guide ring separates the respective clamping members from the advancement slant cam under the clamping means retracting actuation condition when the piston is actuated from the second end side to the first end side through the clamping means advancing lift distance.

3. A hydraulic clamp as recited in claim 1, wherein:
    a through-hole is provided in the piston along substantially the same axis as the axis of the hydraulic cylinder, and a passage is provided in the clamping means such that a clamp member to be formed is inserted into the through-hole and the passage in order from the first side to the second side of the cylinder body, and a passive portion is formed by enlarging the second end side diameter of the clamp member to be forced, the clamping means is adapted to be shifted expansively to the retracted position remote from the axis of the hydraulic cylinder by the retracting means and to be shifted contractively to the advanced position near the axis of the hydraulic cylinder by the advancement slant cam, the passage is kept opened and; the clamping means leaves the passive portion so that the clamp member to be forced can pass through the passage when the clamping means is located in the retracted postion, the clamping means is adapted to be shifted contractively from the retracted position to the advanced position by the guidance of the advancement slant cam such that the passage is narrowed under the clamping means advancing actuation condition when the piston is actuated from the first end side to the second end side throught the clamping means advancing lift distance, and the clamping means is brought in contact with the passive portion so that an actuation force by the piston can be transmitted to the passive portion through the clamping means under the clamping actuation condition when the piston is actuated from the first end side to the second end side through the clamping actuation lift distance.

4. A hydraulic clamp as recited in claim 3, wherein:
the piston, the clamping means; and the advancement slant cam are arranged in said order from the first end side to the second end side of the cylinder body.

5. A hydraulic clamp as recited in claim 4, wherein:
the advancement slant cam comprises an inner cam and an outer cam, with the outer cam fixed secured to the cylinder body and the inner cam supported by the outer cam to be slidable in the direction of the axis of the hydraulic cylinder, a cam restoring spring is provided at the second end side of the inner cam so that the inner cam can be resiliently urged toward the first end side by the cam restoring spring, the clamping means is guided by the outer cam so as to contractively shift from the retracted position to the advanced position under the clamping means advancing actuation condition when the piston is actuated from the first end side to the second end side through the clamping means advancing lift distance, the clamping means is adapted to push the inner cam toward the second end side against the cam restoring spring under the clamping actuation condition when the piston is actuated from the first end side to the second end side through the clamping actuation lift distance so that the clamping means is actuated from the unclamped position to the clamped position and, comprises a limit-switch having a contact facing the inner cam for detecting the clamped position.

6. A hydraulic clamp as recited in claim 3, wherein:
the first end side of the clamp member to be forced is fixedly secured to the fixed member and the cylinder body is adapted to be detachable fitted to the passive portion provided in the second end side of the clamp member to be forced.

7. A hydraulic clamp as recited in claim 3, wherein:
the cylinder body is fixedly secured to the fixed member and the passive portion of the clamp member to be forced is adapted to be detachably fitted to the cylinder body.

8. A hydraulic clamp as recited in claim 7, wherein:
the passive portion of the clamp member to be formed is provided in a member to be clamped for a hydraulic clamp.

9. A hydraulic clamp as recited in claim 6, further comprising:
fixing means for fixedly securing the first side of the cylinder body to a cylinder supporting member, the fixing means comprising a ring-shaped mounting flange, a flange fitting portion and a stopper means, and the flange fitting portion is formed by narrowing a lower portion of the cylinder body, the mounting flange is provided as a separate member relative to the flange fitting portion, and the mounting flange is adapted to be fitted rotatably to the flange fitting portion and to be stopped at an intermediate height of the flange fitting portion by the stopper means, mounting hole in the direction of the axis of the hydraulic cylinder being provided in the mounting flange at a plurality of locations in the peripheral direction thereof, the mounting bolts being inserted into the mounting holes from the second end side of the cylinder body and the mounting bolts also being adapted to be threadably engaged with threaded holes of the cylinder supporting member, and the cylinder body is adapted to be pressedly secured to the cylinder supporting member by pressing the flange fitting portion to the first end side by a tightening force of the mounting bolts through the mounting flange and the stopper means.

10. A hydraulic clamp as recited in claim 6, wherein:
at least two sets of hydraulic clamps are arranged side by side adjacently with mounting portions provided in the respective hydraulic clamps at their first end sides, one of the hydraulic clamps having a prop interposed between the cylinder body and the mounting portion and the width of the prop in the arrangement direction of the two hydraulic clamps being smaller than the width of the cylinder body, the prop of the one hydraulic clamp being disposed adjacently to the cylinder body of the other hydraulic clamp and the first end side surface of the cylinder body of the one hydraulic clamp being located outside the second end side surface of the cylinder body of the other hydraulic clamp, and the respective mounting portions are fixedly secured to the cylinder supporting member by the respective fixing means.

* * * * *